(12) United States Patent
Josephsen

(10) Patent No.: US 10,160,467 B2
(45) Date of Patent: Dec. 25, 2018

(54) CONVERTIBLE CART DEVICE

(71) Applicant: Greg Josephsen, Arlington, SD (US)

(72) Inventor: Greg Josephsen, Arlington, SD (US)

( * ) Notice: Subject to any disclaimer, the term of this patent is extended or adjusted under 35 U.S.C. 154(b) by 0 days.

(21) Appl. No.: 15/403,538

(22) Filed: Jan. 11, 2017

(65) Prior Publication Data

US 2018/0194381 A1  Jul. 12, 2018

(51) Int. Cl.
*B62B 1/20* (2006.01)
*B62B 1/00* (2006.01)
*B62B 1/12* (2006.01)

(52) U.S. Cl.
CPC ............... *B62B 1/20* (2013.01); *B62B 1/008* (2013.01); *B62B 1/12* (2013.01); *B62B 2205/30* (2013.01); *B62B 2206/006* (2013.01); *B62B 2206/02* (2013.01)

(58) Field of Classification Search
None
See application file for complete search history.

(56) References Cited

U.S. PATENT DOCUMENTS

| | | | | |
|---|---|---|---|---|
| 3,704,025 A * | 11/1972 | Cerveny | ................... | A61G 5/08 280/47.19 |
| 4,009,891 A * | 3/1977 | Jensen | .................... | B62B 1/002 280/47.2 |
| D249,031 S * | 8/1978 | Tarran | ............................ | D25/64 |
| D249,032 S * | 8/1978 | Tarran | ............................ | D25/64 |
| 4,136,889 A * | 1/1979 | Middleton | ................ | B62B 1/12 280/30 |
| 4,204,696 A * | 5/1980 | Burger, Jr. | ............ | B62B 5/0083 280/79.11 |
| 4,220,346 A * | 9/1980 | Geschwender | ........... | B62B 1/12 280/47.18 |
| 4,241,930 A * | 12/1980 | Bell | .......................... | B62B 1/10 280/47.29 |
| 4,251,178 A * | 2/1981 | Bourgraf | .................... | B60R 5/04 414/343 |
| 4,281,849 A * | 8/1981 | Chandick | .................. | B62B 1/12 280/652 |
| 4,286,796 A * | 9/1981 | Esposito | ................. | B62B 1/125 280/47.27 |
| 4,341,393 A * | 7/1982 | Gordon | ..................... | B62B 1/20 248/98 |

(Continued)

OTHER PUBLICATIONS

Hand trucks 'r us .com—Cosco 3 position convertable aluminum hand truck flat free wheels.

(Continued)

*Primary Examiner* — John D Walters
*Assistant Examiner* — Hilary L Johns

(57) ABSTRACT

A convertible cart device facilitates transport of a temporary structure and other items needed for use at a stock show, convention or the like. The device includes a pair of wheels coupled to a frame proximate a bottom end of the frame. A handle is removably couplable to a top end of the frame. A noseplate is removably couplable to the frame to define a hand truck. Each of a pair of side panels is removably couplable to the frame with first ends of the side panels being aligned with the top end and second ends of the side panels being outwardly spaced from the bottom end of the frame. The handle is removably couplable to the second ends of the side panels to define a hand cart.

17 Claims, 6 Drawing Sheets

(56) References Cited

U.S. PATENT DOCUMENTS

| | | | | |
|---|---|---|---|---|
| 4,348,034 A * | 9/1982 | Welt | B62B 1/12 | 248/168 |
| 4,355,818 A * | 10/1982 | Watts | B62B 1/12 | 280/47.19 |
| D269,726 S * | 7/1983 | Skille | D34/24 | |
| D273,522 S * | 4/1984 | Zastera | D34/17 | |
| 4,488,733 A * | 12/1984 | Hellsten | B62B 3/009 | 280/47.16 |
| 4,504,071 A * | 3/1985 | Drummond | B62B 5/025 | 280/47.27 |
| 4,565,382 A * | 1/1986 | Sherman | A47B 3/10 | 108/18 |
| 4,570,953 A * | 2/1986 | McPeak | B62B 5/023 | 280/47.29 |
| 4,570,954 A * | 2/1986 | Mintz | B62B 5/025 | 280/47.27 |
| 4,630,837 A * | 12/1986 | Kazmark | B62B 1/002 | 280/47.2 |
| 4,632,627 A * | 12/1986 | Swallows | B25H 1/16 | 187/231 |
| D289,578 S * | 4/1987 | Ruffin | D34/17 | |
| 4,726,602 A * | 2/1988 | Sanders | B62B 1/12 | 211/181.1 |
| 4,790,547 A * | 12/1988 | Mortenson | B62B 1/10 | 280/47.27 |
| 4,836,320 A * | 6/1989 | Sundin | A01D 42/08 | 180/19.1 |
| 4,864,334 A * | 9/1989 | Ellis | B62B 1/26 | 248/129 |
| 4,865,340 A * | 9/1989 | Mortenson | B62B 1/10 | 280/47.27 |
| 4,867,438 A * | 9/1989 | Steckert | A61H 3/04 | 135/67 |
| 4,886,233 A * | 12/1989 | Bateman | A62C 99/00 | 169/91 |
| 4,919,442 A * | 4/1990 | Green | B62B 3/02 | 280/43.1 |
| 4,921,270 A * | 5/1990 | Schoberg | B62B 1/002 | 280/47.27 |
| 4,934,718 A * | 6/1990 | Voegele | B62B 1/12 | 108/12 |
| 5,053,310 A * | 10/1991 | Platzer | G03F 3/10 | 430/143 |
| D328,660 S * | 8/1992 | Hull | D34/24 | |
| 5,201,536 A * | 4/1993 | Bono | A47B 85/06 | 280/30 |
| 5,228,716 A * | 7/1993 | Dahl | B62B 1/002 | 280/47.18 |
| D340,335 S * | 10/1993 | Kean | D34/17 | |
| 5,257,892 A * | 11/1993 | Branch | B62B 3/02 | 280/30 |
| 5,277,439 A * | 1/1994 | Pipes | B62B 1/20 | 280/47.2 |
| 5,316,328 A * | 5/1994 | Bussinger | A61G 5/1089 | 280/304.1 |
| 5,326,116 A * | 7/1994 | Flax | B62B 3/02 | 280/47.29 |
| 5,353,900 A * | 10/1994 | Stilley | A45C 3/004 | 190/115 |
| 5,354,089 A * | 10/1994 | Sohrt | B62B 1/20 | 280/47.315 |
| 5,362,078 A * | 11/1994 | Paton | B62B 1/12 | 280/35 |
| D353,928 S * | 12/1994 | Michael, Jr. | D34/24 | |
| D356,197 S * | 3/1995 | Loughlin | D34/12 | |
| 5,407,039 A * | 4/1995 | Alper | A45C 5/146 | 190/117 |
| 5,445,399 A * | 8/1995 | Salvucci, Sr. | B62B 1/002 | 280/47.2 |
| D364,022 S * | 11/1995 | Kazmark, Jr. | D34/12 | |
| 5,468,010 A * | 11/1995 | Johnson | B62B 1/12 | 280/47.27 |
| 5,474,313 A * | 12/1995 | Marquardt | B62B 1/14 | 280/47.28 |
| 5,476,282 A * | 12/1995 | Dahl | B62B 1/002 | 280/47.18 |
| 5,489,109 A * | 2/1996 | Murphy | B62B 1/12 | 280/415.1 |
| 5,489,183 A * | 2/1996 | Malden | B62B 1/264 | 280/47.28 |
| 5,536,034 A * | 7/1996 | Miller | B62B 1/002 | 108/11 |
| 5,568,848 A * | 10/1996 | Liang | A45C 5/14 | 190/115 |
| 5,577,745 A * | 11/1996 | Birk | B62B 1/12 | 242/129.5 |
| 5,678,976 A * | 10/1997 | Rodriguez | B62B 1/264 | 414/448 |
| 5,707,200 A * | 1/1998 | Liu | B62B 5/0003 | 187/233 |
| 5,758,752 A * | 6/1998 | King | A45C 3/004 | 16/19 |
| 5,765,843 A * | 6/1998 | Miller | B62B 3/001 | 280/43.1 |
| 5,775,865 A * | 7/1998 | Capilupi, Jr. | B62B 5/0003 | 280/47.2 |
| 5,779,251 A * | 7/1998 | Meier | B62B 1/002 | 188/22 |
| D396,673 S * | 8/1998 | Micoley | D12/129 | |
| 5,806,868 A * | 9/1998 | Collins | B62B 1/22 | 280/47.19 |
| 5,810,373 A * | 9/1998 | Miranda | B62B 1/002 | 248/354.1 |
| 5,820,146 A * | 10/1998 | Van Ligten | B62B 1/002 | 280/47.19 |
| 5,833,249 A * | 11/1998 | DeMartino | B62B 5/02 | 280/47.27 |
| 5,884,920 A * | 3/1999 | Seto | B62B 7/02 | 280/1.5 |
| 5,899,297 A * | 5/1999 | Clark | B25H 5/00 | 182/222 |
| D412,044 S * | 7/1999 | Deal | D34/12 | |
| 5,931,483 A * | 8/1999 | Haynes | B62B 1/12 | 280/47.19 |
| 5,941,543 A * | 8/1999 | Kazmark, Jr. | B62B 1/002 | 280/47.29 |
| D414,144 S * | 9/1999 | Freese | D12/129 | |
| 5,957,472 A * | 9/1999 | Borgatti | B62B 1/12 | 280/30 |
| 5,957,482 A * | 9/1999 | Shorter | B62B 3/02 | 280/47.35 |
| 5,967,734 A * | 10/1999 | Liu | B62B 5/0003 | 187/233 |
| 5,971,424 A * | 10/1999 | Ingalls | B62B 1/125 | 280/654 |
| 5,984,326 A * | 11/1999 | Abraham | A45C 5/14 | 190/18 A |
| 5,988,617 A * | 11/1999 | Kyte | B25H 1/00 | 269/47 |
| 5,988,669 A * | 11/1999 | Freese | B62B 7/064 | 280/47.38 |
| 5,993,134 A * | 11/1999 | Williamson | B62B 1/14 | 280/47.27 |
| 6,019,381 A * | 2/2000 | Krawczyk | B62B 1/002 | 211/126.1 |
| 6,041,900 A * | 3/2000 | Sadow | A45C 5/14 | 190/115 |
| 6,053,515 A * | 4/2000 | Kelley | B62B 1/002 | 280/47.18 |
| 6,113,044 A * | 9/2000 | Stratman | A47B 96/06 | 248/220.42 |
| 6,123,345 A * | 9/2000 | Anderson | B62B 1/14 | 280/47.27 |
| 6,131,921 A * | 10/2000 | Ellis | A63C 17/067 | 280/11.211 |
| 6,139,046 A * | 10/2000 | Aalund | B62B 7/08 | 280/47.38 |

(56) References Cited

U.S. PATENT DOCUMENTS

| | | | | |
|---|---|---|---|---|
| 6,164,425 A * | 12/2000 | Latshaw | A45C 5/14 | 190/108 |
| 6,170,839 B1 * | 1/2001 | Kizewski | B25H 3/00 | 280/47.19 |
| 6,193,033 B1 * | 2/2001 | Sadow | A45C 5/14 | 16/405 |
| 6,217,045 B1 * | 4/2001 | Leyton | B62B 3/108 | 280/47.27 |
| 6,224,071 B1 * | 5/2001 | Dummer | B62B 3/104 | 280/47.2 |
| 6,302,250 B1 * | 10/2001 | Sadow | A45C 5/14 | 190/115 |
| 6,302,414 B1 * | 10/2001 | Berthiaume | B62B 1/002 | 280/47.18 |
| 6,308,967 B1 * | 10/2001 | Stallbaumer | B62B 1/002 | 280/47.18 |
| 6,328,319 B1 * | 12/2001 | Stahler, Sr. | B62B 1/002 | 280/47.18 |
| 6,328,329 B1 * | 12/2001 | Smith | B62B 3/027 | 280/33.991 |
| 6,341,406 B1 * | 1/2002 | Beckman | A61G 1/048 | 16/113.1 |
| 6,341,788 B1 * | 1/2002 | Ciccone | B25H 1/00 | 280/47.28 |
| 6,345,829 B1 * | 2/2002 | Mueller | B23D 47/025 | 280/47.18 |
| 6,364,328 B1 * | 4/2002 | Stahler, Sr. | B62B 1/002 | 280/47.18 |
| 6,386,557 B1 * | 5/2002 | Weldon | A47B 13/16 | 108/12 |
| 6,386,560 B2 * | 5/2002 | Calender | B62B 5/0083 | 280/47.34 |
| 6,390,451 B1 * | 5/2002 | Baker | B66D 1/02 | 254/2 B |
| 6,413,032 B1 * | 7/2002 | Casper | B62B 1/264 | 280/47.24 |
| 6,419,244 B2 * | 7/2002 | Meabon | B62B 1/002 | 280/47.17 |
| 6,435,476 B1 * | 8/2002 | Stratman | B66F 13/00 | 254/1 |
| D465,634 S * | 11/2002 | Botzau | | B62B 1/12 D34/24 |
| 6,474,663 B1 * | 11/2002 | Becker | B62B 1/12 | 182/104 |
| 6,478,526 B2 * | 11/2002 | Agee | A01D 87/122 | 280/47.3 |
| 6,481,727 B1 * | 11/2002 | Stallbaumer | B62B 1/10 | 280/47.24 |
| 6,488,304 B2 * | 12/2002 | Krawczyk | B62B 1/002 | 280/408 |
| 6,497,311 B2 * | 12/2002 | Tiramani | A45C 3/001 | 16/113.1 |
| 6,530,583 B1 * | 3/2003 | Mueller | B23D 47/025 | 144/286.5 |
| 6,530,737 B1 * | 3/2003 | Casper | B62B 1/264 | 280/47.24 |
| 6,530,740 B2 * | 3/2003 | Kim | B62B 1/002 | 180/251 |
| 6,557,869 B1 * | 5/2003 | Gillette | B62B 1/12 | 280/47.28 |
| 6,578,856 B2 * | 6/2003 | Kahle | B23D 57/0092 | 108/119 |
| 6,588,775 B2 * | 7/2003 | Malone, Jr. | B62B 1/002 | 280/47.18 |
| 6,601,859 B1 * | 8/2003 | Durham | B62B 1/12 | 280/47.131 |
| 6,616,153 B1 * | 9/2003 | Matre | B62B 1/12 | 280/47.27 |
| 6,616,173 B2 * | 9/2003 | Jenkins | B60S 13/00 | 280/47.131 |
| 6,637,761 B1 * | 10/2003 | Boettcher | B62B 1/12 | 280/47.24 |
| 6,641,148 B2 * | 11/2003 | Schmidt | B25H 3/02 | 280/35 |
| 6,651,774 B2 * | 11/2003 | Yoo | E06C 1/393 | 182/129 |
| D484,295 S * | 12/2003 | Arceta | | D34/17 |
| D484,664 S * | 12/2003 | Arceta | | D34/27 |
| 6,685,200 B1 * | 2/2004 | Giannoni | B62B 3/02 | 108/57.16 |
| 6,694,679 B2 * | 2/2004 | Verna | E04F 21/1894 | 248/351 |
| 6,705,621 B1 * | 3/2004 | Drayer | B62B 1/12 | 280/30 |
| 6,709,222 B2 * | 3/2004 | Inman, Jr. | B62B 1/12 | 280/47.18 |
| D490,200 S * | 5/2004 | Arceta | | D34/17 |
| 6,736,416 B1 * | 5/2004 | Romeo | B62B 1/208 | 280/47.18 |
| D492,829 S * | 7/2004 | Babkes | | D34/24 |
| 6,758,482 B2 * | 7/2004 | Stallbaumer | B62B 1/002 | 280/47.18 |
| 6,808,184 B2 * | 10/2004 | Ames | B62B 3/14 | 280/33.997 |
| 6,832,670 B2 * | 12/2004 | Wolters | A45C 9/00 | 190/115 |
| D501,888 S * | 2/2005 | Arceta | | D20/10 |
| 6,848,881 B2 * | 2/2005 | Henry | B62B 3/001 | 414/469 |
| 6,851,685 B2 * | 2/2005 | Koenig | B62B 1/10 | 280/47.27 |
| 6,866,290 B2 * | 3/2005 | Tsai | B41J 2/14427 | 280/47.29 |
| 6,877,586 B2 * | 4/2005 | Babkes | B62B 1/002 | 182/129 |
| 6,880,835 B2 * | 4/2005 | Tornabene | B62B 1/002 | 182/20 |
| 6,886,836 B1 * | 5/2005 | Wise | B25H 1/04 | 280/30 |
| 6,893,029 B2 * | 5/2005 | Hailston | B62B 1/10 | 280/47.27 |
| 6,893,201 B2 * | 5/2005 | Clery | B62B 3/02 | 280/47.34 |
| 6,899,347 B2 * | 5/2005 | Neal | B62B 1/10 | 108/36 |
| D506,588 S * | 6/2005 | Babkes | | D34/14 |
| 6,902,175 B1 * | 6/2005 | Clavey | B62B 1/10 | 280/47.19 |
| 6,921,095 B2 * | 7/2005 | Middleby | B62B 1/10 | 254/325 |
| 6,929,250 B2 * | 8/2005 | Blake | B62B 1/002 | 254/122 |
| 6,938,905 B1 * | 9/2005 | Tsai | B62B 1/002 | 280/30 |
| 6,942,229 B2 * | 9/2005 | Brazell | B25H 1/04 | 108/119 |
| 6,966,540 B2 * | 11/2005 | Falk | B66F 5/04 | 254/122 |
| 6,971,654 B2 * | 12/2005 | Amsili | B62B 1/002 | 280/47.2 |
| 7,011,316 B1 * | 3/2006 | Peridon | B60N 2/2848 | 280/30 |
| 7,014,197 B2 * | 3/2006 | Baldwin | B62B 3/04 | 280/47.27 |
| 7,014,199 B2 * | 3/2006 | Hendzel | B62B 3/106 | 248/131 |
| 7,025,573 B1 * | 4/2006 | Hardin | F04B 35/06 | 417/234 |
| 7,028,962 B1 * | 4/2006 | Hostetler | B63B 17/00 | 211/75 |
| 7,032,910 B2 * | 4/2006 | Joie | A61M 1/36 | 280/47.131 |
| D524,008 S * | 6/2006 | Babkes | | D34/27 |
| 7,077,421 B2 * | 7/2006 | Wu | B25H 1/04 | 280/30 |
| 7,080,851 B2 * | 7/2006 | Schipper | B24B 27/08 | 280/47.2 |

(56) References Cited

U.S. PATENT DOCUMENTS

| | | | | |
|---|---|---|---|---|
| 7,083,174 | B2* | 8/2006 | Kane | B62B 1/002 280/47.16 |
| 7,089,803 | B1* | 8/2006 | Scoville | G01N 3/20 73/856 |
| 7,090,210 | B2* | 8/2006 | Lawrence | B25H 1/04 269/139 |
| 7,093,691 | B1* | 8/2006 | Vaughan | B66B 9/0815 108/106 |
| D528,731 | S* | 9/2006 | Cragg | D34/24 |
| 7,104,554 | B2* | 9/2006 | Perras | B60B 29/001 254/131 |
| D532,176 | S* | 11/2006 | Ditmars, Jr. | D34/21 |
| 7,134,515 | B2* | 11/2006 | Lenkman | B62D 51/04 180/11 |
| 7,163,213 | B2* | 1/2007 | Chambers | B62B 1/002 180/209 |
| 7,165,776 | B2* | 1/2007 | Quinlan, Jr. | B66F 7/0625 211/207 |
| 7,178,812 | B1* | 2/2007 | Bryan | B62B 1/14 280/248 |
| D538,998 | S* | 3/2007 | Henry | D34/23 |
| 7,195,255 | B1* | 3/2007 | Tsai | B62B 5/06 280/47.29 |
| 7,195,257 | B2* | 3/2007 | Stoneback | B62B 3/104 280/280 |
| 7,213,829 | B2* | 5/2007 | Wu | B25H 1/04 280/30 |
| D544,159 | S* | 6/2007 | McCoy | B62B 1/006 D32/37 |
| D546,511 | S* | 7/2007 | Luster | D32/37 |
| 7,246,805 | B2* | 7/2007 | Neal | A45C 5/14 280/35 |
| 7,255,355 | B2* | 8/2007 | Chisholm | B25H 1/04 248/439 |
| 7,284,309 | B2* | 10/2007 | Park | B25B 27/0035 29/225 |
| 7,306,245 | B1* | 12/2007 | Lowe | B25H 3/02 280/47.18 |
| 7,325,814 | B2* | 2/2008 | Sparacino | B62B 1/12 280/47.131 |
| 7,331,596 | B2* | 2/2008 | Tiramani | B25H 1/04 280/30 |
| 7,357,398 | B2* | 4/2008 | O'Connor | B25H 3/00 280/47.131 |
| 7,377,525 | B1* | 5/2008 | Whitmore | B25H 1/04 280/39 |
| 7,389,996 | B2* | 6/2008 | Dube | B62B 3/104 280/35 |
| 7,416,195 | B2* | 8/2008 | Zwack | B62B 1/264 280/43.1 |
| 7,419,169 | B2* | 9/2008 | Intravatola | B62B 1/264 280/47.26 |
| 7,422,229 | B2* | 9/2008 | Coslovi | B62B 1/12 280/47.2 |
| 7,437,801 | B2* | 10/2008 | Dahl | B60B 3/001 16/18 R |
| 7,448,608 | B2* | 11/2008 | Radermacher | B23D 47/025 144/267 |
| 7,448,632 | B1* | 11/2008 | Nieto | B62B 1/006 280/47.18 |
| 7,487,976 | B1* | 2/2009 | Williams | B60B 3/001 280/47.21 |
| 7,500,682 | B1* | 3/2009 | Del Marmol | B62B 1/002 280/47.2 |
| 7,513,511 | B2* | 4/2009 | Chaseateau | B62B 1/002 280/43.1 |
| 7,543,614 | B2* | 6/2009 | Wise | B25H 1/04 108/36 |
| 7,588,254 | B2* | 9/2009 | Anthony | A63B 55/00 206/315.1 |
| 7,588,255 | B2* | 9/2009 | Katz | A47B 3/08 280/47.18 |
| 7,600,765 | B2* | 10/2009 | Tsai | B62B 1/002 280/47.18 |
| 7,628,408 | B2* | 12/2009 | Kolesa | B62B 3/08 280/47.27 |
| 7,628,410 | B2* | 12/2009 | Fitzgerald | A47F 3/06 280/47.19 |
| D608,073 | S* | 1/2010 | Alves | B62B 1/006 D34/24 |
| D608,969 | S* | 1/2010 | Wise | D34/12 |
| 7,641,206 | B2* | 1/2010 | Knoebel | B62B 3/04 280/47.131 |
| 7,645,108 | B2* | 1/2010 | Benko | B62B 1/125 280/47.29 |
| 7,648,155 | B1* | 1/2010 | Wise | B25H 1/04 280/35 |
| 7,651,104 | B1* | 1/2010 | Hilt | B62B 3/104 280/35 |
| 7,690,515 | B2* | 4/2010 | Thibodeau | B65D 19/44 211/11 |
| 7,712,582 | B2* | 5/2010 | Burton | B62B 1/12 187/238 |
| 7,726,669 | B2* | 6/2010 | Alexander | A47B 37/00 280/47.131 |
| 7,806,426 | B2* | 10/2010 | Van Landingham, Jr. | B62B 3/02 280/47.35 |
| 7,823,893 | B2* | 11/2010 | Meyers | B62B 1/12 280/47.18 |
| 7,841,471 | B2* | 11/2010 | Tagliaferri | B65D 19/0036 206/501 |
| 7,871,089 | B1* | 1/2011 | Henderson | B62B 1/042 280/47.27 |
| 7,874,562 | B2* | 1/2011 | Fitzgerald | A47F 10/04 280/47.34 |
| 7,886,853 | B2* | 2/2011 | Konopa | B62B 1/26 180/19.1 |
| 7,914,016 | B2* | 3/2011 | Guttormson | B62B 1/12 211/74 |
| 7,914,017 | B2* | 3/2011 | Setzer, Sr. | B62B 1/10 280/47.17 |
| 7,934,730 | B2* | 5/2011 | Francis | B62B 1/14 280/47.18 |
| 7,946,598 | B1* | 5/2011 | Malone, Jr. | B62B 1/002 280/47.18 |
| 7,950,687 | B2* | 5/2011 | Ludlow | B62B 1/20 280/43.11 |
| 7,971,898 | B2* | 7/2011 | Wise | B25H 1/04 108/79 |
| 7,984,916 | B2* | 7/2011 | Schwager | F16D 49/00 280/62 |
| D644,395 | S* | 8/2011 | Dechant | D34/26 |
| D644,396 | S* | 8/2011 | Dechant | D34/26 |
| D644,397 | S* | 8/2011 | Wood | D34/26 |
| D644,398 | S* | 8/2011 | Wood | D34/26 |
| D644,399 | S* | 8/2011 | Dechant | D34/26 |
| D644,400 | S* | 8/2011 | Wood | D34/26 |
| D644,401 | S* | 8/2011 | Dechant | D34/26 |
| 8,042,829 | B2* | 10/2011 | Hailston | B62B 3/008 280/30 |
| 8,061,723 | B1* | 11/2011 | Carroll | A63B 9/0002 280/47.26 |
| 8,062,402 | B2* | 11/2011 | Bland, Jr. | B01D 46/10 55/480 |
| 8,070,181 | B2* | 12/2011 | Forrest | B62B 3/02 280/35 |
| 8,083,458 | B2* | 12/2011 | Wilkie | B66F 9/06 212/195 |
| D652,190 | S* | 1/2012 | Slaton | D34/17 |
| 8,087,678 | B2* | 1/2012 | Nowak | B62B 1/264 280/35 |
| 8,091,904 | B1* | 1/2012 | Zinszer | B62B 1/22 211/85.7 |
| 8,100,416 | B1* | 1/2012 | Bloomfield | B62B 1/22 280/43.1 |
| 8,100,430 | B2* | 1/2012 | Meyers | B62B 1/002 280/30 |

(56) References Cited

U.S. PATENT DOCUMENTS

| | | | | |
|---|---|---|---|---|
| 8,100,626 B2 * | 1/2012 | Shai | B66F 3/46 | 414/607 |
| 8,123,238 B1 * | 2/2012 | Burgess | B60D 1/01 | 280/47.131 |
| 8,128,106 B2 * | 3/2012 | Hollins | B62B 1/14 | 280/47.24 |
| 8,154,137 B1 * | 4/2012 | Flegel | F02B 63/048 | 290/1 A |
| D661,859 S * | 6/2012 | Blakeman | D34/26 | |
| D664,402 S * | 7/2012 | Blakeman | D7/606 | |
| 8,240,683 B1 * | 8/2012 | Haslup, Sr. | B62B 5/0033 | 280/47.24 |
| 8,276,692 B1 * | 10/2012 | Nwaeke | B62B 5/003 | 180/19.1 |
| 8,282,111 B2 * | 10/2012 | Hailston | B62B 3/0618 | 280/43.12 |
| 8,353,524 B2 * | 1/2013 | Gonzalez | B62B 3/02 | 280/47.19 |
| 8,360,444 B2 * | 1/2013 | Colacecchi | B62B 1/12 | 280/47.18 |
| 8,408,361 B2 * | 4/2013 | Chung | B62B 1/12 | 182/20 |
| 8,408,562 B1 * | 4/2013 | Tse | B62B 3/02 | 280/38 |
| 8,413,999 B2 * | 4/2013 | Nassaux | B62B 3/02 | 280/47.16 |
| 8,452,464 B2 * | 5/2013 | Castaneda | B66F 9/0755 | 180/19.2 |
| 8,465,046 B2 | 6/2013 | Meyers et al. | | |
| D687,614 S * | 8/2013 | Simpson | D34/26 | |
| 8,505,691 B2 * | 8/2013 | Smeeton | B66F 9/07504 | 187/222 |
| 8,556,279 B2 * | 10/2013 | McKinnon | B62B 1/10 | 280/47.27 |
| 8,556,280 B1 * | 10/2013 | Latimer | B62B 5/0023 | 280/47.28 |
| 8,579,304 B2 * | 11/2013 | Setzer, Sr. | B66F 9/08 | 280/47.17 |
| 8,579,320 B2 * | 11/2013 | Chiu | B25H 1/04 | 248/439 |
| 8,602,443 B2 * | 12/2013 | Moore | B62B 3/002 | 280/651 |
| 8,613,464 B2 * | 12/2013 | Blakeman | A45C 5/08 | 280/30 |
| 8,651,500 B2 * | 2/2014 | Mitchell | B62B 3/0606 | 280/47.18 |
| 8,708,350 B2 * | 4/2014 | Bottazzi | B62B 1/002 | 280/35 |
| D707,415 S * | 6/2014 | Carlson | D34/23 | |
| D709,664 S * | 7/2014 | Plummer | D34/26 | |
| 8,764,046 B2 * | 7/2014 | Baldemor | B62B 1/002 | 280/47.29 |
| 8,789,836 B2 * | 7/2014 | Umbro | B62B 1/042 | 280/47.26 |
| 8,794,898 B2 * | 8/2014 | Suyehira | B62B 1/14 | 414/452 |
| 8,801,005 B1 * | 8/2014 | Flickner | B62B 3/04 | 280/35 |
| 8,814,199 B2 * | 8/2014 | Shindelar | B62B 3/02 | 280/47.34 |
| 8,820,773 B2 * | 9/2014 | Ferree, Jr. | B62B 3/02 | 280/47.17 |
| 8,870,194 B2 * | 10/2014 | Goellner | B62B 1/14 | 280/47.18 |
| 8,905,701 B2 * | 12/2014 | Van Der Helm | B62B 1/10 | 187/253 |
| 8,910,970 B2 * | 12/2014 | Chen | B25H 1/04 | 280/652 |
| D723,238 S * | 2/2015 | Spates | D34/20 | |
| 8,967,651 B1 | 3/2015 | Simic | | |
| 9,004,509 B2 * | 4/2015 | Smith | B62B 3/108 | 280/651 |
| 9,010,771 B2 * | 4/2015 | Holtan | B62B 1/001 | 280/33.992 |
| D733,385 S * | 6/2015 | Spates | D34/20 | |
| 9,045,321 B2 * | 6/2015 | Ford | B66F 9/07513 | |
| 9,050,992 B2 * | 6/2015 | Smith | B25H 1/04 | |
| 9,096,249 B2 * | 8/2015 | Gibson | B62B 1/002 | |
| 9,096,251 B2 * | 8/2015 | Bowden | B62B 1/12 | |
| 9,126,611 B2 * | 9/2015 | Liu | B62B 5/067 | |
| 9,139,214 B2 * | 9/2015 | Rich | B62B 3/0606 | |
| 9,150,230 B2 * | 10/2015 | Panigot | B62B 1/12 | |
| 9,162,856 B2 * | 10/2015 | Elliott | B66F 3/08 | |
| 9,208,635 B2 * | 12/2015 | Fitzgerald | E05B 47/023 | |
| 9,233,699 B2 * | 1/2016 | Murphy | B62B 1/12 | |
| 9,245,406 B2 * | 1/2016 | Fitzgerald | A47F 3/06 | |
| D749,812 S * | 2/2016 | Gibson | D34/26 | |
| 9,278,040 B2 * | 3/2016 | Hung | G06F 3/01 | |
| 9,278,703 B1 * | 3/2016 | Hollub, IV | B25H 1/04 | |
| 9,302,689 B2 * | 4/2016 | Burton | B62B 1/12 | |
| 9,321,471 B1 * | 4/2016 | Gedeon-Janvier | B62B 1/002 | |
| D760,462 S * | 6/2016 | Kellogg | D3/304 | |
| D760,463 S * | 6/2016 | Kellogg | D32/36 | |
| 9,365,225 B2 * | 6/2016 | Henao | B62B 3/02 | |
| 9,371,083 B1 * | 6/2016 | Jones | B62B 3/16 | |
| 9,371,655 B1 * | 6/2016 | Davis | E04F 21/0023 | |
| 9,376,130 B1 * | 6/2016 | Wise | B62B 1/042 | |
| D762,937 S * | 8/2016 | Leban | D34/27 | |
| 9,428,156 B2 * | 8/2016 | Davison | B60P 3/07 | |
| RE46,150 E * | 9/2016 | Liao | B62B 3/02 | |
| D768,348 S * | 10/2016 | Kellogg | D32/36 | |
| 9,478,093 B2 * | 10/2016 | Broom | B62B 3/004 | |
| 9,615,638 B2 * | 4/2017 | Moskowitz | A45C 5/14 | |
| 9,615,704 B1 * | 4/2017 | Becker | F24F 13/32 | |
| 9,616,907 B1 * | 4/2017 | Gibson | B62B 1/12 | |
| 9,616,908 B2 * | 4/2017 | Brown | B62B 1/20 | |
| 9,624,078 B2 * | 4/2017 | Cozza | B66F 5/00 | |
| D786,741 S * | 5/2017 | Bussinger | D12/133 | |
| 9,637,149 B1 * | 5/2017 | Wang | B62B 1/002 | |
| 9,675,508 B2 * | 6/2017 | Hall | B66F 3/247 | |
| 9,688,298 B1 * | 6/2017 | Su | B62B 1/002 | |
| 9,750,323 B2 * | 9/2017 | Berger | B62B 3/022 | |
| 9,758,184 B1 * | 9/2017 | Vaverek | B62B 1/20 | |
| D800,410 S * | 10/2017 | Bussinger | D34/37 | |
| D802,925 S * | 11/2017 | Cassel | D3/304 | |
| D804,136 S * | 11/2017 | Meyers | D34/26 | |
| 9,809,240 B2 * | 11/2017 | Broom | B62B 3/005 | |
| 9,834,241 B2 * | 12/2017 | Riha | B62B 1/002 | |
| 9,834,421 B2 * | 12/2017 | Raper, Jr. | B66F 5/02 | |

OTHER PUBLICATIONS

Dolly, Hand Truck Convertible—rentals, Plymouth MN Higway 55 Rental.

* cited by examiner

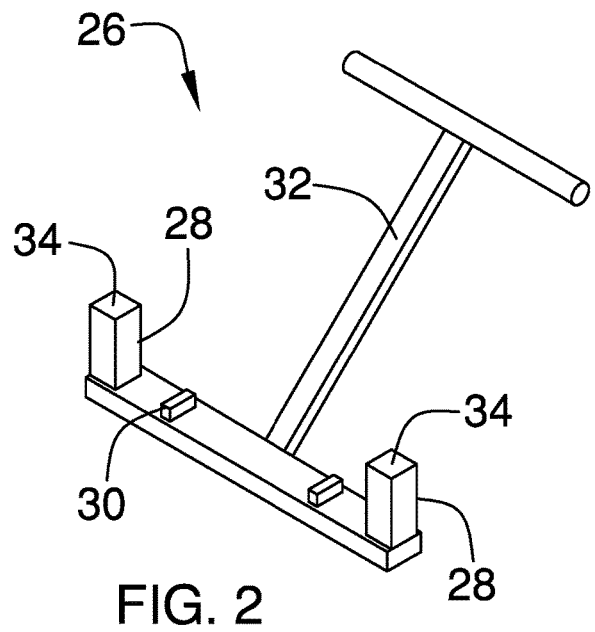
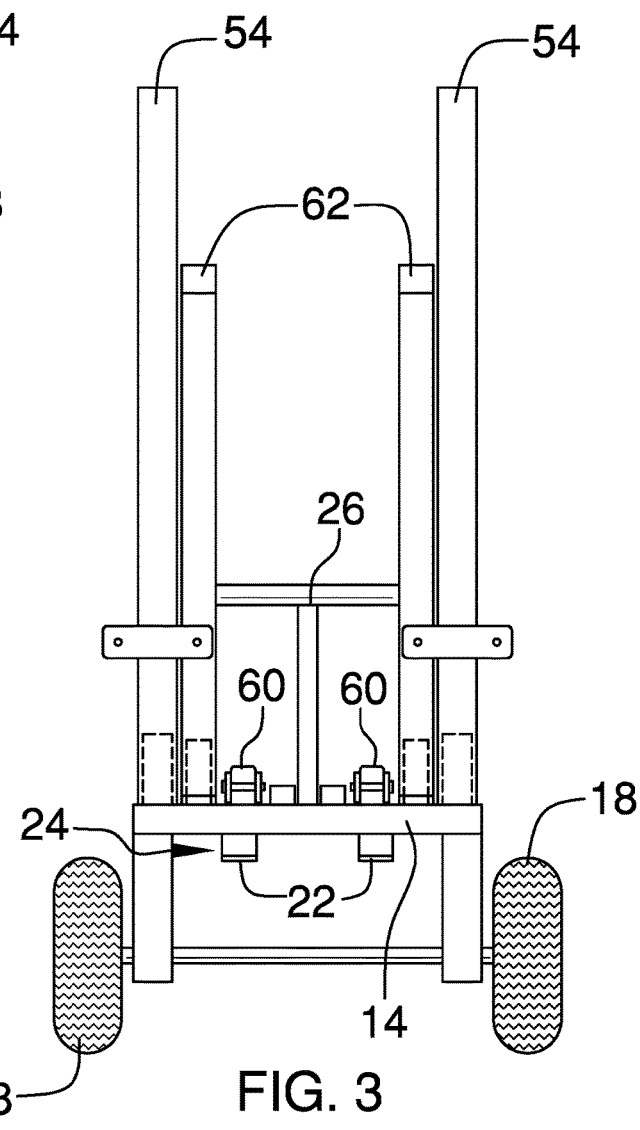

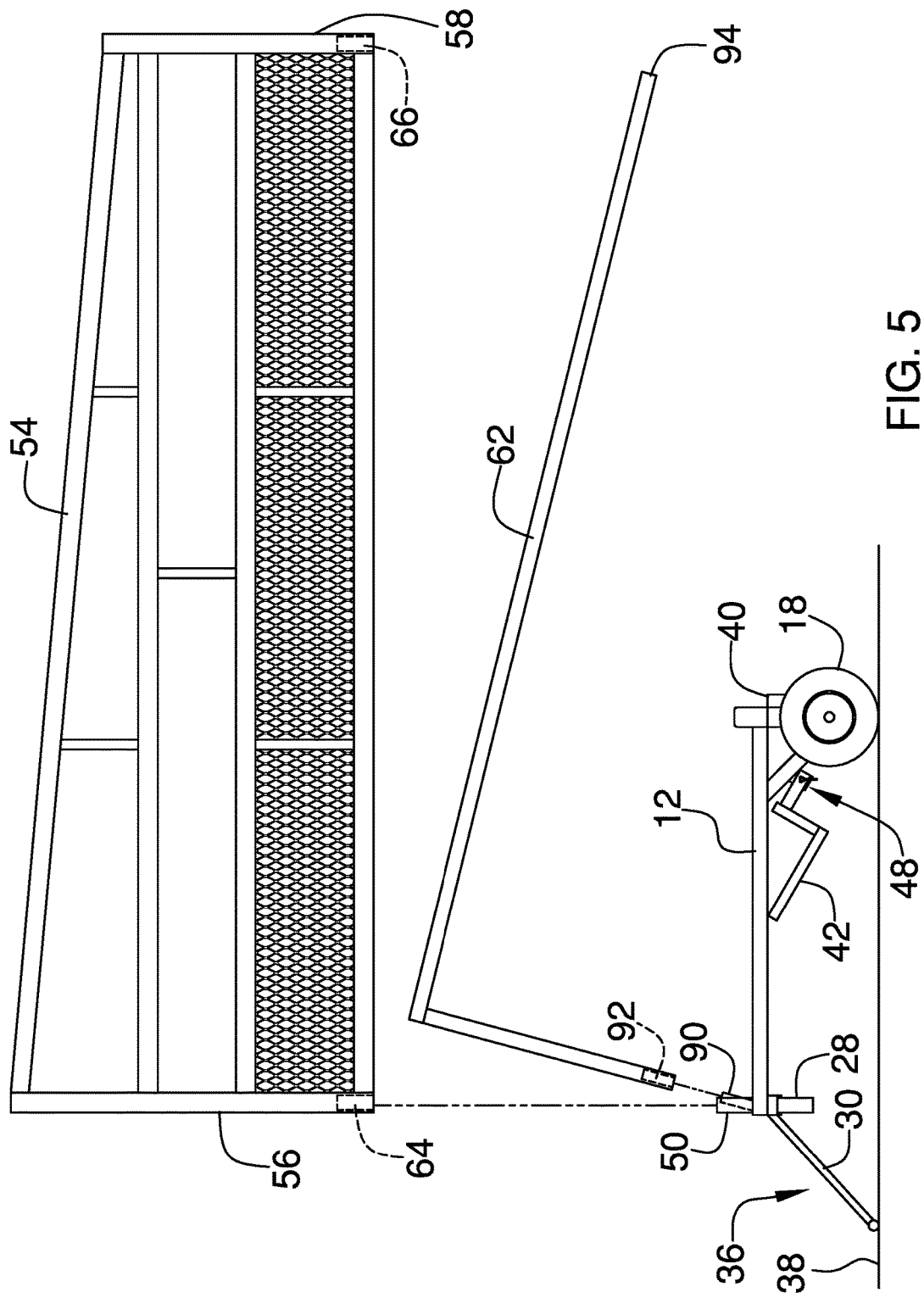

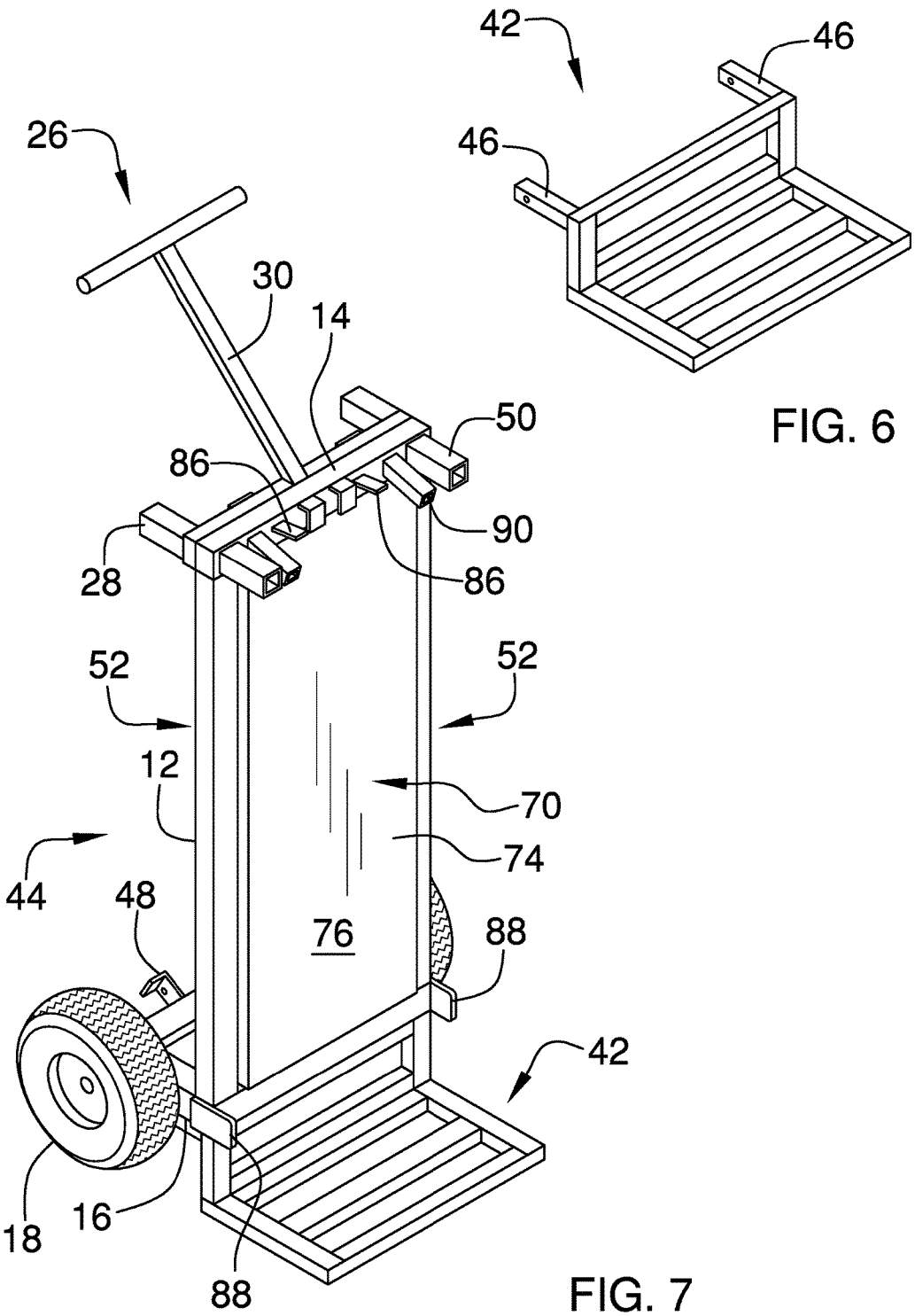

CONVERTIBLE CART DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cart devices and more particularly pertains to a new cart device for facilitating transport of a temporary structure and other items needed for use at a stock show, convention or the like.

BRIEF SUMMARY OF THE INVENTION

An embodiment of the disclosure meets the needs presented above by generally comprising a pair of wheels coupled to a frame proximate a bottom end of the frame. A handle is removably couplable to a top end of the frame. A noseplate is removably couplable to the frame to define a hand truck. Each of a pair of side panels is removably couplable to the frame with first ends of the side panels being aligned with the top end and second ends of the side panels being outwardly spaced from the bottom end of the frame. The handle is removably couplable to the second ends of the side panels to define a hand cart.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a top front side perspective view of a handle of an embodiment of the disclosure.

FIG. 3 is an end view of an embodiment of the disclosure.

FIG. 5 is a partial exploded top side perspective view of an embodiment of the disclosure.

FIG. 6 is a top front side perspective view of a noseplate of an embodiment of the disclosure.

FIG. 7 is a top front side perspective view of an embodiment of the disclosure in a hand truck configuration.

DETAILED DESCRIPTION OF THE INVENTION

Figure 1:
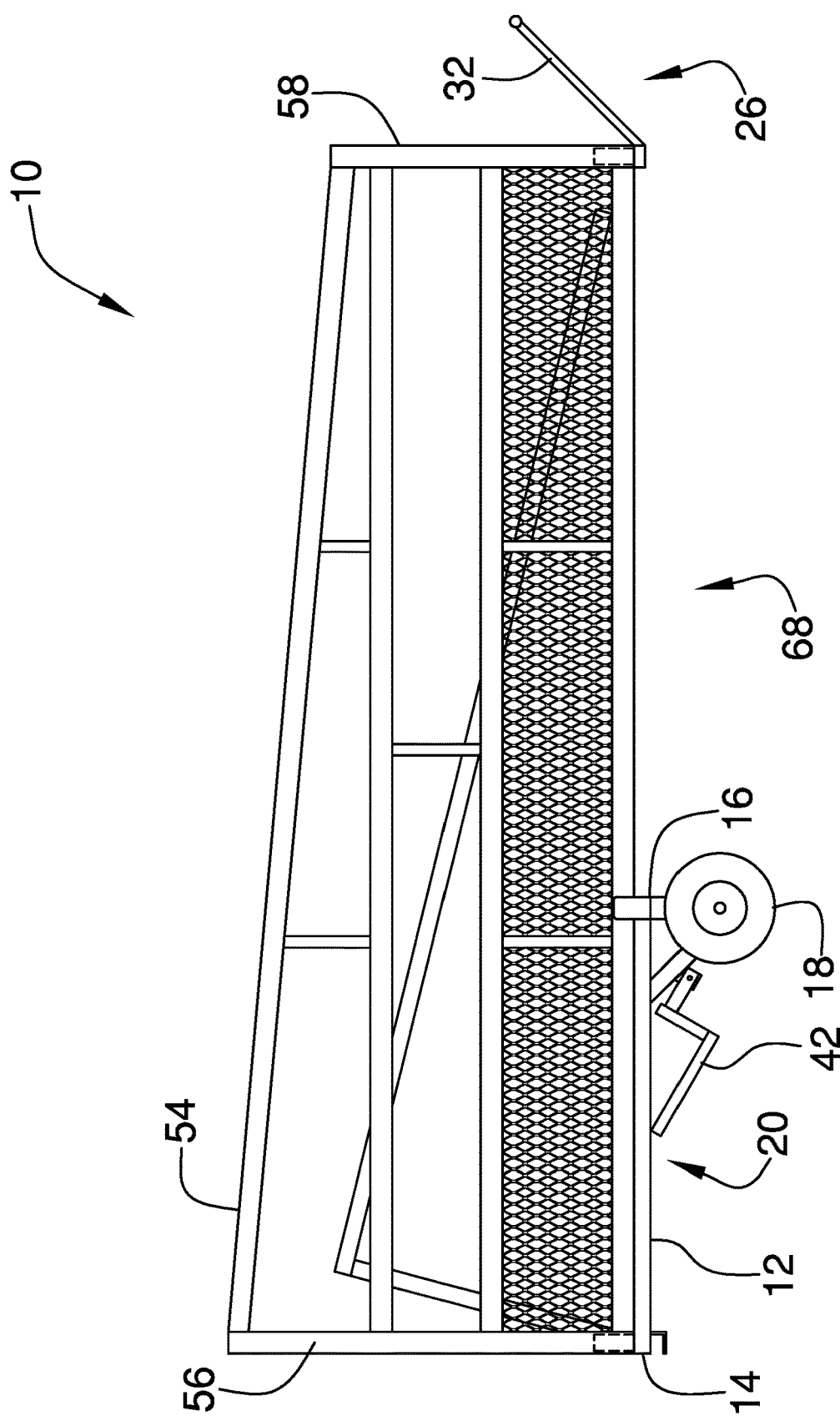
FIG. 1 is a top side perspective view of a convertible cart device according to an embodiment of the disclosure.
Figure 4:
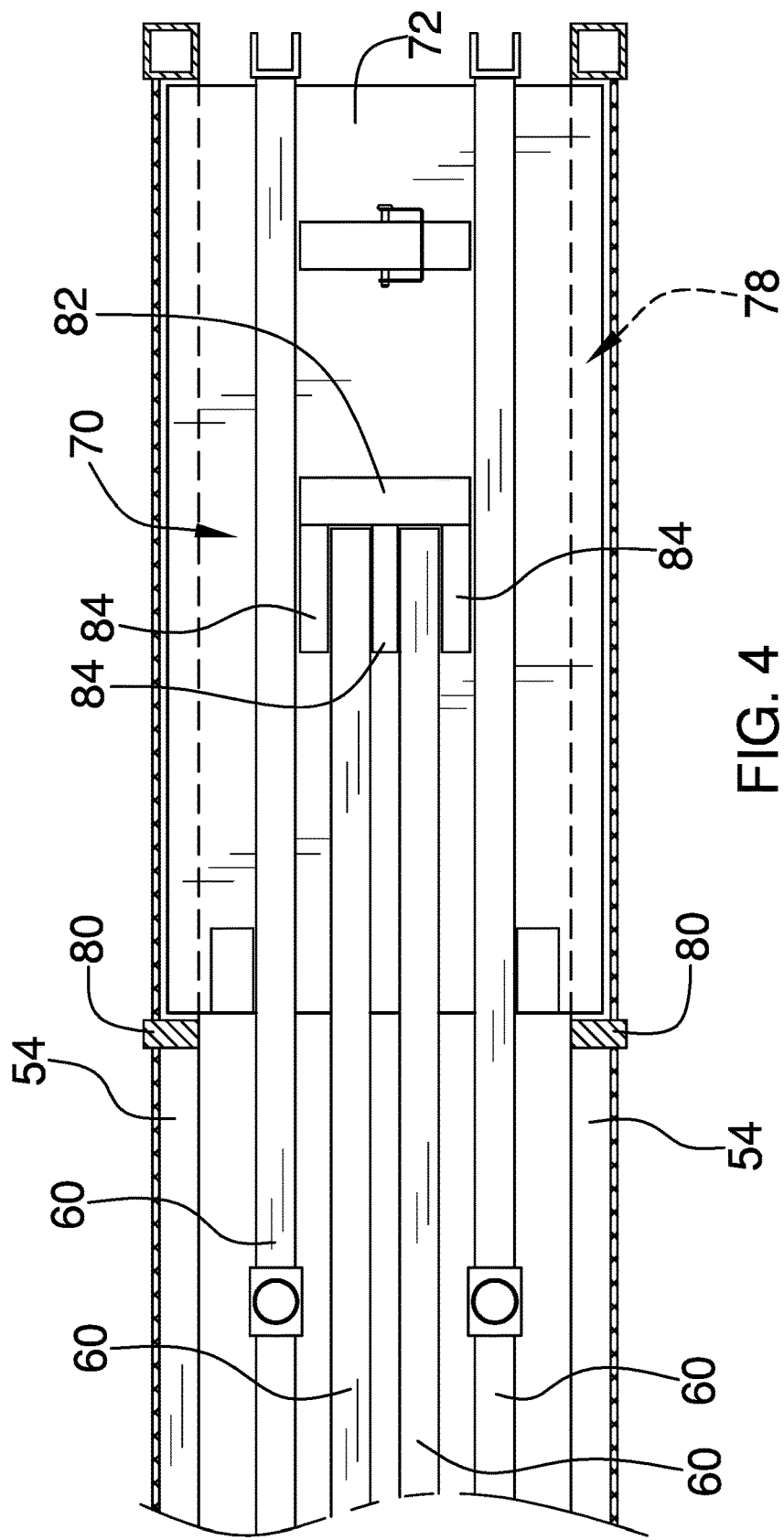
FIG. 4 is a partial top view of an embodiment of the disclosure.
Figure 8:
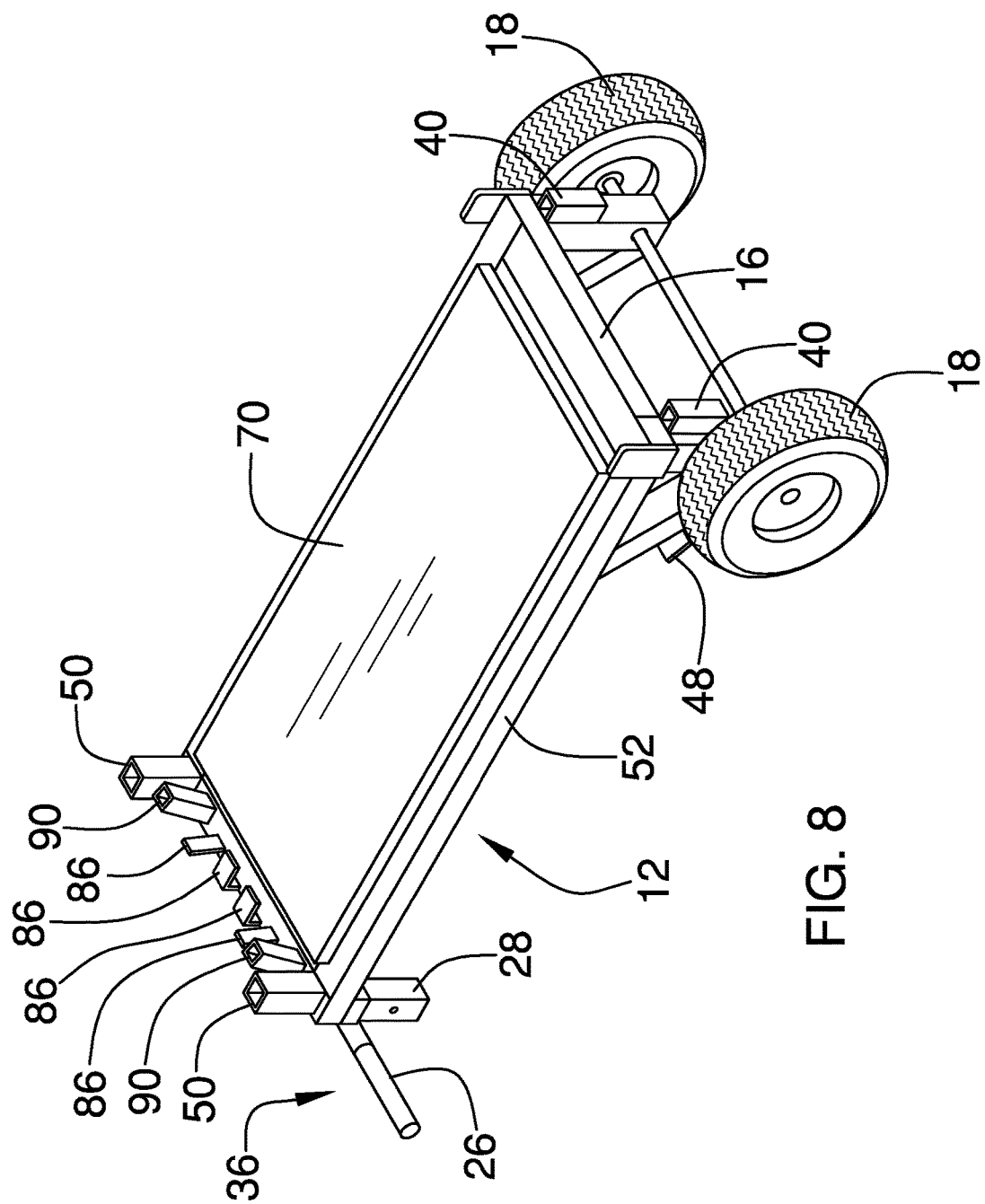
FIG. 8 is a partial top front side perspective view of a frame of an embodiment of the disclosure.

With reference now to the drawings, and in particular to FIGS. 1 through 8 thereof, a new cart device embodying the principles and concepts of an embodiment of the disclosure and generally designated by the reference numeral 10 will be described.

As best illustrated in FIGS. 1 through 8, the convertible cart device 10 generally comprises a frame 12 having a top end 14 and a bottom end 16 opposite the top end 14. Each of a pair of wheels 18 is coupled to the frame 12 proximate the bottom end 16 of the frame 12. Each of the pair of wheels 16 is offset from a rear face 20 of the frame 12. The frame 12 is generally planar and positionable in a horizontal plane wherein the frame 12 is positioned above the wheels 18. A handle bracket 22 is coupled to the frame 12 adjacent to the top end 14 of the frame 12. The handle bracket 22 defines a handle connection slot 24 with the frame 12. There may be a plurality of handle brackets 22 similarly positioned and spaced along the top end 14 of the frame 12 to define the handle connection slot 24.

A handle 26 is removably couplable to the top end 14 of the frame 12. The handle 26 has a pair of shafts 28. The shafts 28 are coplanar and spaced apart on a spacing bar 30. The spacing bar 30 of the handle 26 is insertable into the handle connection slot 24 for coupling the handle 26 to the frame 12 at the top end 14. The handle 26 may be secured within the handle connection slot 24 by various conventional connection structures or mechanisms including but not limited to aligned holes and connection pins, or the like. When coupled to the top end 14 of the frame 12, the handle 26 is held in a static position relative to the frame 12. The handle 26 has an extension 32 coupled to and extending away from the spacing bar 30. The extension 32 is angled relative to the shafts 28 such that the extension 32 extends away from the spacing bar 30 and towards distal ends 34 of the shafts 28 relative to the spacing bar 30. The handle 26 is coupleable to the frame 12 such that the extension 32 extends away from the top end 14 of the frame 12 and the rear face 20 of the frame 12 wherein the handle 26 is configured to define a kickstand 36 to support the top end 14 of the frame 12 in an elevated position over a support surface 38. This positioning is advantageous for assembly and disassembly of the device 10 as described further below.

Each of a pair of noseplate collars 40 is coupled to and positioned at the bottom end 16 of the frame 12. A noseplate 42 is removably couplable to the bottom end 16 of the frame 12 wherein the frame 12 and the noseplate 42 define a hand truck 44 when the handle 26 is coupled to the top end 14 of the frame 12. The noseplate 42 has a pair of bars 46. The bars 46 are coplanar and spaced apart. The bars 46 is insertable into the noseplate collars 40 for coupling the noseplate 42 to the bottom end 16 of the frame 12. The noseplate 42 is held in a static position relative to the frame 12 when attached to the noseplate collars 40 using conventional connectors such as aligned holes and pins or the like. A nospelate storage bracket 48 is coupled to the frame 12. The noseplate 42 is removably couplable to the noseplate storage bracket 48 for storage of the noseplate 42 extending from the rear face 20 of the frame 20. The wheels 18 are positioned to support the frame 12 at a height such that the positioning of the noseplate 42 will not interfere with functioning of the device 10 as further described below. The noseplate 42 and wheels 18 are also sized to support the frame 12 in a substantially vertical orientation on a flat horizontal surface without additional support when the noseplate 42 is coupled to the bottom end 16 of the frame 12.

Each of a pair of side panel connection posts 50 is coupled to and extends from the frame 12. Each of the side panel connection posts 50 extends perpendicularly from the frame 12 and is aligned with an associated longitudinal side 52 of the frame 12. Each of a pair of side panels 54 has a respective first end 56 and a respective second end 58. The side panels 54 are further configured, shaped and sized for use with elongated members 60, L-shaped beams 62, or other structures to form a conventional temporary stall, chute, or other structure such as is commonly found in conventions, stock showings, or the like. Each side panel 54 is removably couplable to the frame 12 such that the first ends 56 of the side panels 54 are substantially aligned with the top end 14 of the frame 12. Each of the side panels 54 has a length greater than a longitudinal length of the frame 12 wherein the second ends 58 of the side panels 54 are outwardly spaced from the bottom end 16 of the frame 12. Each side panel 54 has a respective first end receiver 64 for receiving an associated one of the side panel connection posts 50 for coupling the side panels 54 to the frame 12. While a length of the side panel connection posts may be extended such that unintentional disengagement of the side panels 54 from the frame 12 is unlikely, conventional pins, connectors, locking mechanisms, or the like may be used to prevent the side panels 54 from disengaging from the side panel connection posts 50. Each side panel 54 has a respective second end receiver 66. The side panels 54 are substantially similar in size such that the second end receivers 66 are aligned and coplanar when the side panels 54 are coupled to the side panel connection posts 50. The handle 26 is removably couplable to the second ends 58 of the side panels 54 wherein the frame 12 is configured for use as a hand cart 68 by lifting of the handle 26 such that the frame 12 is pivoted on the wheels 18 to facilitate movement of the frame 12 on the support surface 38. Each of the shafts 28 is insertable into respective one of the second end receivers 66 for coupling the handle 26 to the second ends 58 of the side panels 54. Again, conventional pins or other locking or securing mechanisms may be used to prevent unwanted or unintended disengagement of the handle 26 from the side panels 54.

A floor panel 70 is substantially planar having a first face 72 and a second face 74. The floor panel 70 is couplable to the frame 12 with the first face 72 abutting the frame 12 wherein the second face 74 is positioned to define a supporting surface 76 for the hand truck 44. The floor panel 70 is secured to the frame 12 in a conventional manner again using pins or another conventional mechanism for holding the floor panel 70 against the frame 12 during use of the hand cart 44. The floor panel 70 is alternatively positionable to extend between the side panels 54 when the side panels 54 are coupled to the frame 12. The side panels 54 may provide oppositely positioned lips 78 upon which the floor panel 70 can rest. The side panels 54 may also provide stops 80 to prevent the floor panel 70 from sliding on the lips 78. The floor panel 70 may also be separately secured using pins of the like extending through the floor panel 70 and the side panels 54 in a conventional manner. The floor panel 70 is positionable between the side panels 54 to expose the first face 72 facing upwardly between the side panels 54. At least one divider 82 is coupled to or integrally formed in the floor panel 70. The divider 82 extends from the first face 72 of the floor panel 70 wherein the divider 82 defines a plurality of channels 84 on the floor panel 70. Thus, the divider 82 is configured for holding the elongated members 60 in separated positions on the floor panel 70. The divider 82 may be configured to provide respective channels 84 for each elongated member 60 needed for the temporary structure to facilitate visual inspection to insure all parts of the temporary structure are properly stored for transport.

Each of a plurality of seats 86 is coupled to the frame 12. Each of the seats 86 is aligned with an associated one of the channels 84. Each of the seats 86 has a conventional structure such as but not limited to defining a socket/ receiver, tongue/groove, or the like, such that the seats 86 are configured for coupling to a respective one of the elongated members 60 while the respective one of the elongated members 60 is positioned in the associated one of the channels 84 wherein the elongated members 60 are held in a static position relative to the frame 12.

Each of a pair of side fins 88 is coupled to and extends from an associated longitudinal side 52 of the frame 12 wherein the side fins 88 are positioned to maintain alignment of the side panels 54 with the longitudinal sides 52 of the frame 12. The side fins 88 are substantially aligned over the wheels 18 when the frame 12 is in a horizontal orientation.

Each of a pair of L-beam connection posts 90 is coupled to and extends from the frame 12. Each of the L-beam connection posts 90 is positioned along the top end 14 of the frame 12. Each of the L-beam connection posts 90 is angled relative to the frame 12 to extend away from the frame 12 and towards the bottom end 16 of the frame 12 wherein each L-beam connection post 90 is configured for insertion into an end socket 82 on a respective L-shaped beam 62 such that a distal end 94 of the L-shaped beam 62 is supported by the floor panel 70 extending between the side panels 54. Each of the L-beam connection posts 90 is positioned adjacent to a respective one of the side panel connection posts 50.

In use, the device 10 is convertible between the hand truck 44 and the hand cart 68 incorporating the components of the temporary structure. Thus, transport of the components of the temporary structure is facilitated to make multiple separate trips unnecessary. When the side panels 54 and other components of the temporary structure are removed from the frame 12, the handle 26 and noseplate 42 are positionable to provide the hand truck 44 for use further facilitating transport of additional items which may be needed during a presentation, show, convention or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A convertible cart device comprising:
a frame having a top end and a bottom end opposite said top end;
a pair of wheels coupled to said frame proximate said bottom end of said frame;
a handle, said handle being removably couplable to said top end of said frame;
a noseplate, said noseplate being removably couplable to said bottom end of said frame wherein said frame and said noseplate define a hand truck when said handle is coupled to said top end of said frame;
a pair of side panels, each of said side panels having a respective first end and a respective second end, each said side panel being removably couplable to said frame such that said first ends of said side panels are substantially aligned with said top end of said frame, each of said side panels having a length greater than a longitudinal length of said frame wherein said second ends of said side panels are outwardly spaced from said bottom end of said frame;
said handle being removably couplable to said second ends of said side panels wherein said frame is configured for use as a hand cart by lifting of said handle such that said frame is pivoted on said wheels to facilitate movement of said frame on a support surface; and
a nospelate storage bracket coupled to said frame, said noseplate being removably couplable to said noseplate storage bracket for storage of said noseplate.

2. The device of claim 1, further comprising a floor panel, said floor panel being substantially planar having a first face and a second face, said floor panel being couplable to said frame with said first face abutting said frame wherein said second face is positioned to define a support surface for said hand truck.

3. The device of claim 2, further comprising said floor panel being positionable to extend between said side panels when said side panels are coupled to said frame, said first face being exposed between said side panels.

4. The device of claim 3, further comprising a divider coupled to and extending from said first face of said floor panel wherein said divider defines a plurality of channels on said floor panel wherein said divider is configured for holding elongated members in separated positions on said floor panel.

5. The device of claim 1, further comprising:
each of said pair of wheels being offset from a rear face of said frame; and
said handle being coupleable to said frame such that said extension extends away from said top end of said frame and said rear face of said frame wherein said handle is configured to define a kickstand to support said top end of said frame in an elevated position over a supporting surface.

6. A convertible cart device comprising:
a frame having a top end and a bottom end opposite said top end;
a pair of wheels coupled to said frame proximate said bottom end of said frame;
a handle, said handle being removably couplable to said top end of said frame;
a noseplate, said noseplate being removably couplable to said bottom end of said frame wherein said frame and said noseplate define a hand truck when said handle is coupled to said top end of said frame;
a pair of side panels, each of said side panels having a respective first end and a respective second end, each said side panel being removably couplable to said frame such that said first ends of said side panels are substantially aligned with said top end of said frame, each of said side panels having a length greater than a longitudinal length of said frame wherein said second ends of said side panels are outwardly spaced from said bottom end of said frame;
said handle being removably couplable to said second ends of said side panels wherein said frame is configured for use as a hand cart by lifting of said handle such that said frame is pivoted on said wheels to facilitate movement of said frame on a support surface;
a floor panel, said floor panel being substantially planar having a first face and a second face, said floor panel being couplable to said frame with said first face abutting said frame wherein said second face is positioned to define a support surface for said hand truck, said floor panel being positionable to extend between said side panels when said side panels are coupled to said frame, said first face being exposed between said side panels;
a divider coupled to and extending from said first face of said floor panel wherein said divider defines a plurality of channels on said floor panel wherein said divider is configured for holding elongated members in separated positions on said floor panel; and
a plurality of seats coupled to said frame, each of said seats being aligned with an associated one of said channels, each of said seats being configured for coupling to a respective one of the elongated members while the respective one of the elongated members is positioned in said associated one of said channels wherein the elongated members are held in a static position relative to said frame.

7. A convertible cart device comprising:
a frame having a top end and a bottom end opposite said top end;
a pair of wheels coupled to said frame proximate said bottom end of said frame;
a handle, said handle being removably couplable to said top end of said frame;

a noseplate, said noseplate being removably couplable to said bottom end of said frame wherein said frame and said noseplate define a hand truck when said handle is coupled to said top end of said frame;
a pair of side panels, each of said side panels having a respective first end and a respective second end, each said side panel being removably couplable to said frame such that said first ends of said side panels are substantially aligned with said top end of said frame, each of said side panels having a length greater than a longitudinal length of said frame wherein said second ends of said side panels are outwardly spaced from said bottom end of said frame;
said handle being removably couplable to said second ends of said side panels wherein said frame is configured for use as a hand cart by lifting of said handle such that said frame is pivoted on said wheels to facilitate movement of said frame on a support surface; and
a pair of side fins, each of said side fins being coupled to and extending from an associated longitudinal side of said frame wherein said side fins are positioned to maintain alignment of said side panels with said longitudinal sides of said frame.

8. The device of claim 7, further comprising said side fins being substantially aligned with said wheels.

9. A convertible cart device comprising:
a frame having a top end and a bottom end opposite said top end;
a pair of wheels coupled to said frame proximate said bottom end of said frame;
a handle, said handle being removably couplable to said top end of said frame;
a noseplate, said noseplate being removably couplable to said bottom end of said frame wherein said frame and said noseplate define a hand truck when said handle is coupled to said top end of said frame;
a pair of side panels, each of said side panels having a respective first end and a respective second end, each said side panel being removably couplable to said frame such that said first ends of said side panels are substantially aligned with said top end of said frame, each of said side panels having a length greater than a longitudinal length of said frame wherein said second ends of said side panels are outwardly spaced from said bottom end of said frame;
said handle being removably couplable to said second ends of said side panels wherein said frame is configured for use as a hand cart by lifting of said handle such that said frame is pivoted on said wheels to facilitate movement of said frame on a support surface;
each said side panel having a respective second end receiver; and
said handle having a pair of shafts, said shafts being coplanar and spaced apart, each of said shafts being insertable into respective one of said second end receivers for coupling said handle to said second ends of said side panels.

10. A convertible cart device comprising:
a frame having a top end and a bottom end opposite said top end;
a pair of wheels coupled to said frame proximate said bottom end of said frame;
a handle, said handle being removably couplable to said top end of said frame;
a noseplate, said noseplate being removably couplable to said bottom end of said frame wherein said frame and said noseplate define a hand truck when said handle is coupled to said top end of said frame;
a pair of side panels, each of said side panels having a respective first end and a respective second end, each said side panel being removably couplable to said frame such that said first ends of said side panels are substantially aligned with said top end of said frame, each of said side panels having a length greater than a longitudinal length of said frame wherein said second ends of said side panels are outwardly spaced from said bottom end of said frame;
said handle being removably couplable to said second ends of said side panels wherein said frame is configured for use as a hand cart by lifting of said handle such that said frame is pivoted on said wheels to facilitate movement of said frame on a support surface;
a pair of noseplate collars, each of said noseplate collars being coupled to and positioned at said bottom end of said frame; and
said noseplate having a pair of bars, said bars being coplanar and spaced apart, said bars being insertable into said noseplate collars for coupling said noseplate to said bottom end of said frame.

11. The device of claim 1, further comprising:
a pair of side panel connection posts being coupled to and extending from said frame; and
each of said side panels having a respective first end receiver for receiving an associated one of said side panel connection posts for coupling said side panels to said frame.

12. The device of claim 11, further comprising each of said side panel connection posts extending perpendicularly from said frame.

13. A convertible cart device comprising:
a frame having a top end and a bottom end opposite said top end;
a pair of wheels coupled to said frame proximate said bottom end of said frame;
a handle, said handle being removably couplable to said top end of said frame;
a noseplate, said noseplate being removably couplable to said bottom end of said frame wherein said frame and said noseplate define a hand truck when said handle is coupled to said top end of said frame;
a pair of side panels, each of said side panels having a respective first end and a respective second end, each said side panel being removably couplable to said frame such that said first ends of said side panels are substantially aligned with said top end of said frame, each of said side panels having a length greater than a longitudinal length of said frame wherein said second ends of said side panels are outwardly spaced from said bottom end of said frame;
said handle being removably couplable to said second ends of said side panels wherein said frame is configured for use as a hand cart by lifting of said handle such that said frame is pivoted on said wheels to facilitate movement of said frame on a support surface; and
a pair of L-beam connection posts coupled to and extending from said frame, each of said L-beam connection posts being positioned along said top end of said frame, each of said L-beam connection posts being angled to extend away from said frame and towards said bottom end of said frame wherein each said L-beam connection post is configured for insertion into an end socket on a respective L-shaped beam such that a distal end of the L-shaped beam is supported by a floor panel extending between said side panels.

14. The device of claim 13, further comprising:
a pair of side panel connection posts being coupled to and extending from said frame, each of said side connection posts being aligned with an associated longitudinal side of said frame; and
each of said L-beam connection posts being positioned adjacent to a respective one of said side panel connection posts.

15. A convertible cart device comprising:
a frame having a top end and a bottom end opposite said top end;
a pair of wheels coupled to said frame proximate said bottom end of said frame;
a handle, said handle being removably couplable to said top end of said frame;
a noseplate, said noseplate being removably couplable to said bottom end of said frame wherein said frame and said noseplate define a hand truck when said handle is coupled to said top end of said frame;
a pair of side panels, each of said side panels having a respective first end and a respective second end, each said side panel being removably couplable to said frame such that said first ends of said side panels are substantially aligned with said top end of said frame, each of said side panels having a length greater than a longitudinal length of said frame wherein said second ends of said side panels are outwardly spaced from said bottom end of said frame;
said handle being removably couplable to said second ends of said side panels wherein said frame is configured for use as a hand cart by lifting of said handle such that said frame is pivoted on said wheels to facilitate movement of said frame on a support surface;
a handle bracket coupled to said frame adjacent to said top end of said frame, said handle bracket defining a handle connection slot with said frame; and
said handle being insertable into said handle connection slot for coupling said handle to said frame at said top end.

16. The device of claim 15, further comprising said handle having a pair of shafts, said shafts being coplanar and spaced apart on a spacing bar, handle having an extension coupled to and extending away from said spacing bar, said extension being angled relative to said shafts such that said extension extends away from said spacing bar and towards distal ends of said shafts relative to said spacing bar.

17. A convertible cart device comprising:
a frame having a top end and a bottom end opposite said top end;
a pair of wheels coupled to said frame proximate said bottom end of said frame, each of said pair of wheels being offset from a rear face of said frame;
a handle bracket coupled to said frame adjacent to said top end of said frame, said handle bracket defining a handle connection slot with said frame;
a handle, said handle being removably couplable to said top end of said frame, said handle having a pair of shafts, said shafts being coplanar and spaced apart on a spacing bar, said spacing bar of said handle being insertable into said handle connection slot for coupling said handle to said frame at said top end, said handle having an extension coupled to and extending away from said spacing bar, said extension being angled relative to said shafts such that said extension extends away from said spacing bar and towards distal ends of said shafts relative to said spacing bar, said handle being coupleable to said frame such that said extension extends away from said top end of said frame and said rear face of said frame wherein said handle is configured to define a kickstand to support said top end of said frame in an elevated position over a supporting surface;
a pair of noseplate collars, each of said noseplate collars being coupled to and positioned at said bottom end of said frame;
a noseplate, said noseplate being removably couplable to said bottom end of said frame wherein said frame and said noseplate define a hand truck when said handle is coupled to said top end of said frame, said noseplate having a pair of bars, said bars being coplanar and spaced apart, said bars being insertable into said noseplate collars for coupling said noseplate to said bottom end of said frame;
a nospelate storage bracket coupled to said frame, said noseplate being removably couplable to said noseplate storage bracket for storage of said noseplate;
a pair of side panel connection posts being coupled to and extending from said frame, each of said side panel connection posts extending perpendicularly from said frame and being aligned with an associated longitudinal side of said frame;
a pair of side panels, each of said side panels having a respective first end and a respective second end, each said side panel being removably couplable to said frame such that said first ends of said side panels are substantially aligned with said top end of said frame, each of said side panels having a length greater than a longitudinal length of said frame wherein said second ends of said side panels are outwardly spaced from said bottom end of said frame, each said side panel having a respective first end receiver for receiving an associated one of said side panel connection posts for coupling said side panels to said frame, each said side panel having a respective second end receiver, said handle being removably couplable to said second ends of said side panels wherein said frame is configured for use as a hand cart by lifting of said handle such that said frame is pivoted on said wheels to facilitate movement of said frame on a support surface, each of said shafts being insertable into respective one of said second end receivers for coupling said handle to said second ends of said side panels;
a floor panel, said floor panel being substantially planar having a first face and a second face, said floor panel being couplable to said frame with said first face abutting said frame wherein said second face is positioned to define a support surface for said hand truck, said floor panel being positionable to extend between said side panels when said side panels are coupled to said frame, said first face being exposed between said side panels;
a divider coupled to and extending from said first face of said floor panel wherein said divider defines a plurality of channels on said floor panel wherein said divider is configured for holding elongated members in separated positions on said floor panel;
a plurality of seats coupled to said frame, each of said seats being aligned with an associated one of said channels, each of said seats being configured for coupling to a respective one of the elongated members while the respective one of the elongated members is positioned in said associated one of said channels wherein the elongated members are held in a static position relative to said frame;

a pair of side fins, each of said side fins being coupled to and extending from an associated longitudinal side of said frame wherein said side fins are positioned to maintain alignment of said side panels with said longitudinal sides of said frame, said side fins being substantially aligned with said wheels;

a pair of L-beam connection posts coupled to and extending from said frame, each of said L-beam connection posts being positioned along said top end of said frame, each of said L-beam connection posts being angled to extend away from said frame and towards said bottom end of said frame wherein each said L-beam connection post is configured for insertion into an end socket on a respective L-shaped beam such that a distal end of the L-shaped beam is supported by a floor panel extending between said side panels, each of said L-beam connection posts being positioned adjacent to a respective one of said side panel connection posts.

* * * * *